United States Patent
Rivalier et al.

(10) Patent No.: US 7,134,991 B2
(45) Date of Patent: Nov. 14, 2006

(54) ANNULAR CENTRIFUGAL EXTRACTOR WITH EMBEDDED STIRRING ROTOR

(75) Inventors: Patrick Rivalier, Mauguio (FR); Jean Duhamet, Bagnols sur Ceze (FR); Florent Gandi, Saint Andre d'Olerargues (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/487,426

(22) PCT Filed: Jun. 27, 2003

(86) PCT No.: PCT/FR03/01992

§ 371 (c)(1),
(2), (4) Date: Jul. 7, 2004

(87) PCT Pub. No.: WO2004/002631

PCT Pub. Date: Jan. 8, 2004

(65) Prior Publication Data

US 2005/0003944 A1    Jan. 6, 2005

(30) Foreign Application Priority Data

Jul. 1, 2002    (FR) .................................. 02 08206

(51) Int. Cl.
B04B 5/06    (2006.01)
B04B 7/08    (2006.01)
B04B 11/06    (2006.01)

(52) U.S. Cl. ............................ 494/22; 494/64; 494/65; 494/67

(58) Field of Classification Search .................. 494/22, 494/43, 46, 60, 63, 64, 65, 67, 74, 79
See application file for complete search history.

(56) References Cited

U.S. PATENT DOCUMENTS

| 2,474,006 | A | * | 6/1949 | Maycock ..................... 261/83 |
| 2,474,007 | A | * | 6/1949 | Maycock ..................... 261/83 |
| 2,819,014 | A | * | 1/1958 | Zabriskie, Jr. ............... 494/22 |
| 3,332,614 | A | * | 7/1967 | Webster et al. ............... 494/22 |
| 3,674,196 | A | * | 7/1972 | Gutter ......................... 494/60 |
| 4,786,480 | A | * | 11/1988 | Martin ...................... 422/259 |
| 4,824,430 | A | * | 4/1989 | Kashihara et al. ............ 494/22 |
| 4,857,040 | A | * | 8/1989 | Kashihara et al. ............ 494/22 |
| 4,925,441 | A | * | 5/1990 | Jubin .......................... 494/32 |
| 4,959,158 | A | * | 9/1990 | Meikrantz ................... 210/787 |
| 5,024,647 | A | * | 6/1991 | Jubin et al. .................. 494/37 |
| 5,254,075 | A | * | 10/1993 | Nemoto et al. .............. 494/35 |
| 5,254,076 | A | * | 10/1993 | Chow et al. ................. 494/37 |
| 5,267,936 | A | * | 12/1993 | Miachon ...................... 494/22 |
| 5,571,070 | A | * | 11/1996 | Meikrantz et al. ............ 494/22 |
| 5,591,340 | A | * | 1/1997 | Meikrantz et al. ....... 210/512.3 |
| 5,624,371 | A | * | 4/1997 | Mohn .......................... 494/22 |
| 5,762,800 | A | * | 6/1998 | Meikrantz et al. ....... 210/512.3 |

(Continued)

FOREIGN PATENT DOCUMENTS

EP    0312045    *    4/1989

(Continued)

Primary Examiner—Charles E. Cooley
(74) Attorney, Agent, or Firm—Oblon, Spivak, McClelland, Maier & Neustadt P.C.

(57) ABSTRACT

An annular centrifugal extractor with an immersed agitation rotor. The liquid-liquid centrifugal extractor including an emulsion chamber and a settling chamber, aligned because of the addition of a section of axis to the rotor, which allows flow and operation to be regularized, especially by allowing the dimensions of the chambers to be selected more freely.

11 Claims, 2 Drawing Sheets

U.S. PATENT DOCUMENTS

| | | | |
|---|---|---|---|
| 6,102,843 A * | 8/2000 | Kelley et al. | 494/29 |
| 6,203,483 B1 * | 3/2001 | Birdwell et al. | 494/22 |
| 6,238,329 B1 * | 5/2001 | Rogers | 494/22 |
| 6,379,293 B1 * | 4/2002 | Kim et al. | 494/56 |
| 6,440,054 B1 * | 8/2002 | Galik | 494/22 |
| 6,699,169 B1 * | 3/2004 | Ogino et al. | 494/22 |
| 6,976,947 B1 * | 12/2005 | Ogino et al. | 494/22 |
| 2005/0003944 A1 * | 1/2005 | Rivalier et al. | 494/22 |
| 2006/0011563 A1 * | 1/2006 | Meikrantz | 494/22 |

FOREIGN PATENT DOCUMENTS

| | | | |
|---|---|---|---|
| EP | 0343802 A1 * | 11/1989 | |
| FR | 2576525 * | 8/1986 | |
| JP | 57-117358 * | 7/1982 | |
| JP | 57-180402 * | 11/1982 | |
| JP | 57-180403 * | 11/1982 | |
| JP | 57-180404 * | 11/1982 | |

* cited by examiner

ANNULAR CENTRIFUGAL EXTRACTOR WITH EMBEDDED STIRRING ROTOR

The present invention relates to centrifugal extractor for an extraction process with two liquids.

Liquid-liquid extraction processes for constituents of mixtures via centrifuge have currently been utilized for a long time in the chemical, pharmaceutical and nuclear industries, in particular. Certain equipment utilized to carry out these processes are annular centrifugal extractors, in which the mixtures are introduced into a bowl of a rotating rotor at one end and exit at the opposite end. The separation results from decantation in which the heavy phase of the mixture is centrifuged at the periphery of the bowl, while the light phase gathers closer to the centre of rotation.

Extractors applying extraction to two liquids are generally double entry, that is, the liquid phases to be mixed and separated enter via generally different conduits. They are then mixed in an emulsion by means of the rotor before entering the bowl. One of these liquid phases is called a supply phase and comprises solutes to be extracted, and the other is called a solvent and preferably harnesses certain of the solutes. Mixing the phases followed by their separation has these solutes pass into the solvent and the extracts of the supply phase. Transfer of the solutes can also be carried out in the direction of the solvent to the aqueous phase and is thus called disextraction.

Reference is now made to attached figures, in which.

Figure 1:
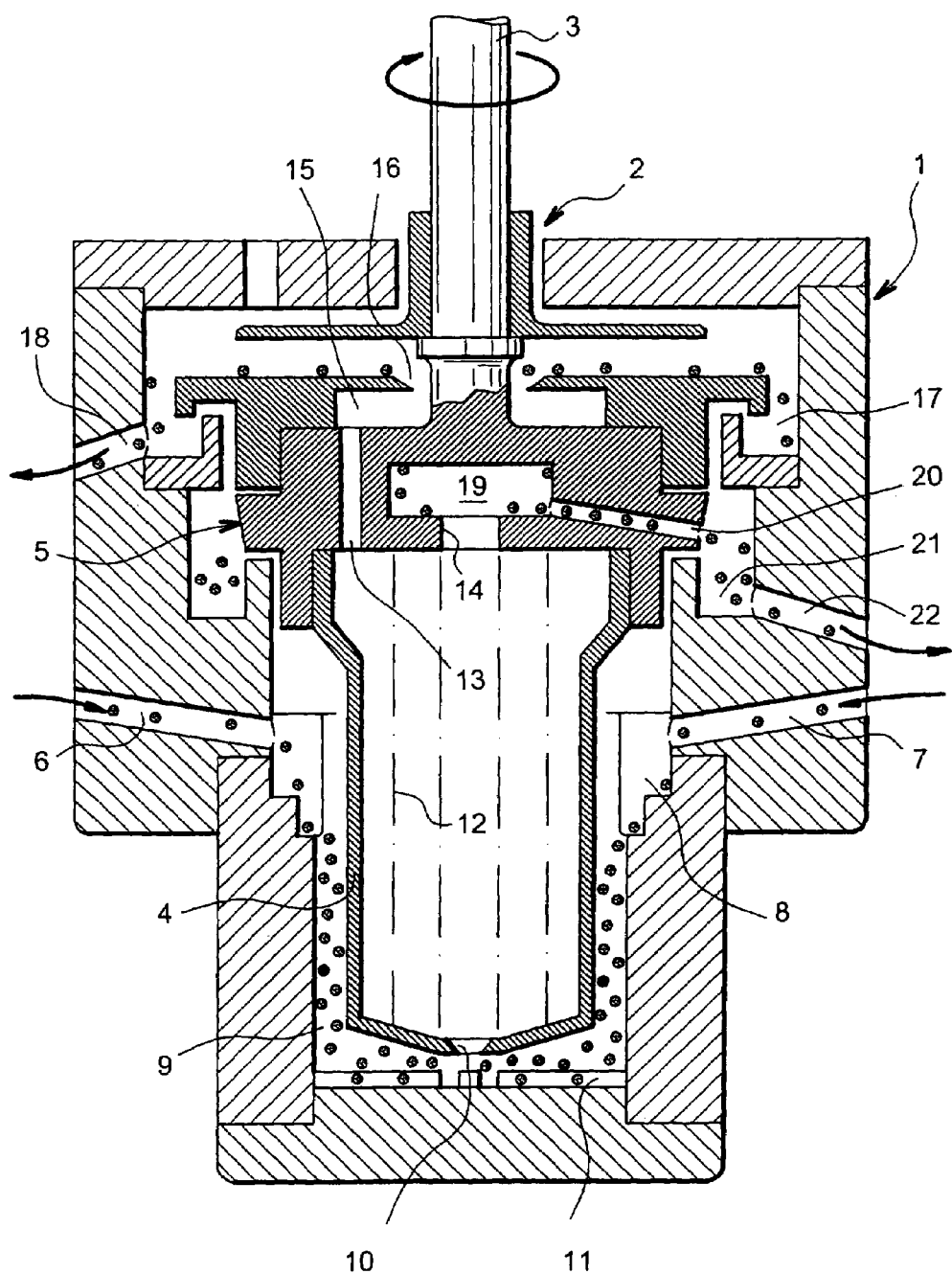
FIG. 1 illustrates a known annular centrifugal extractor.

An example of known annular extractor is given in FIG. 1, where it essentially comprises a housing 1 and a rotor 2 turning inside it. The rotor 2 comprises a motor arbour 3, a bowl 4 and a block 5 connecting these two to one another. It turns about a vertical axis, with the bowl 4 being placed at the bottom. The housing 7 comprises two entry channels 6 and 7 of the phases, which empty into an internal chamber 8 containing the bowl, then flow into a narrow annular space 9 between the bowl 4 and the housing 1, where they are emulsified by the chopping forces produced by rotation of the bowl 4. On arriving at the bottom of the housing 1, they flow under the bowl 4. Reliefs known as counter-blades 11 are installed at the base of the housing 1 to brake rotation of the emulsion and to direct it towards an orifice 10 located at the centre of the bottom of the bowl 4.

From the effect of the centrifugal force the emulsion from the phases is decanted inside the bowl 4 after having passed over the orifice 10, the heavy phase gathering against the wall of the bowl 4 up to an interface 12, and the light phase being beyond this interface 12 towards the axis of rotation. The separated mixture flows to the top of the bowl 4 and exits from there via a conduit 13 located to the side of the heavy phase, and through a first outlet 14 located to the side of the light phase. The conduit 13 leads to an intermediate heavy phase chamber 15, which the heavy phase leaves by passing through a second outlet 15, and it discharges towards a gathering ring of the heavy phase 17. The light phase passes into an intermediate chamber 19, then into an evacuation channel 20, which leads it to a gathering ring of light phase 21.

The gathering rings 17 and 21 are located on the peripheral wall of the housing 1, one above the other, while the above elements were worked in the block 5 integral with the bowl 4. Outlet pipes 18 and 22 terminate in the gathering rings 17 and 21 conveying the separated phases to the exterior.

Certain refinements can complicate the structure of this annular extractor, but difficulties in correctly regulating the apparatus are encountered, in terms of the agitation creating the emulsion, the decantation causing separation as well as the capacity to suction the emulsion into the bowl, depending above all on the rotation of the bowl 4, and rotation speed reconciling optimal functioning of these three functions is often impossible to find. The most significant risk is excessive aspiration of the phases in emulsion in the bowl, which would result in a very current contact time and consequently to poor transfer efficacy, or to aspiration of air. By reducing the speed of rotation of the rotor 3, this risk would be eliminated, but decantation would then be less.

It is also difficult to select favourable dimensions for the elements of the extractor, and in particular the bowl 4, of which the diameter and the height must be sufficient to produce the chopping of emulsion, which develops only with the narrowness of the interval between the housing 1 and the bowl 4, and must also be exerted over a sufficient flow length in the space 9. It eventuates that the volume of the bowl 4 becomes significant, and what is known as the hold-up (the stock taking) of the extractor increases, that is, the quantity of liquid held back there and which is to be reduced since it is temporarily subtracted in other treatments in the industrial process, and that it complicates emptying the extractor during shutdown.

It is also a disadvantage that the rotation of the liquid in emulsion must be braked by the counter-blades 11 to direct it to the orifice 10, before resuming rotation occurs in the bowl 4, causing energy loss. Finally, it has sometimes been stated that the interface 12 was not always in the expected range, and this makes operation of the extractor uncertain.

All these factors explain certain operating limits, in particular for the separation rate, encountered in this type of extractor.

In its most general form the invention consists of a centrifugal extractor of two fluid phases, comprising a central rotor turning about an axis of rotation and comprising a bowl, a stator, a settling chamber in the bowl of the rotor and an emulsion chamber between the rotor and the stator, the emulsion and settling chambers communicating between them and the emulsion chamber being placed under the settling chamber, characterised in that the emulsion and settling chambers are aligned in succession on the axis of rotation of the rotor, the rotor comprising a section of axis delimiting the emulsion chamber.

The consequences of this original arrangement can be put as follows. The radius dimensions of the emulsion and settling chambers become independent, allowing them to be better selected. The emulsion chamber can thus be constructed with a small radius so that a Couette-Poiseuille flow can be installed there, which is favourable to the regularity of the process, whereas the settling chamber can remain fairly wide with a greater radius than that of the emulsion chamber, which was excluded by the preceding construction, but allows superior centrifugal forces to be maintained.

The heights (or lengths) of the two chambers are also independent, allowing for a short settling chamber whereof the volume remains moderate, but a long and narrow emulsion chamber to benefit the latter, while the settling chamber was longer than the emulsion chamber in the known design.

An important aspect of the invention is modular construction, wherein the rotor and the stator are separably made up of assemblable portions, the rotor comprising a first portion having a peripheral wall of the settling chamber and a second portion comprising the section of axis. Then it becomes possible to select the dimensions of the emulsion and settling chambers and to adapt them to particular conditions of the extraction process, if sets of different pieces are used to make up the rotor and the stator. According to particular arrangements, the second portion of the rotor comprises a base of the bowl attached to the first portion, and radii joining the base to the section of axis; or the stator comprises two superposed portions whereof one is hollowed by a cavity delimiting an external wall of the emulsion chamber; or again, the bowl is a mobile discharge portion of a light phase outside the settling chamber.

The movement of flow is that much more regular between the emulsion chamber and the settling chamber since their alignment is accompanied by passage from one to the other, without switching rotation of the fluid using counter-blades or means of the same type.

The narrow emulsion chamber discharges a significant volume at the base of the extractor, which can be occupied by inlet channels of the phases extending substantially vertically at the side of the emulsion chamber and joining it at their base. These channels serve as retaining channels, that is, reservoirs partially filled from the phases before they pass into the emulsion chamber. It then becomes improbable to aspirate air in the emulsion chamber, which maintains the constant volume placed in emulsion, and regularises the work of the extractor as much in emulsion as in settling.

Another beneficial arrangement is obtained if the section of axis of the rotor has an increase in radius, on a portion extending into the settling chamber, in the direction of the emulsion chamber.

Another possibility of air inlet, this time downstream of the emulsion chamber, is then blocked if the section of axis has a periphery plunging into the liquid of the settling chamber at the site where it is the widest.

A final refinement to be mentioned here is realised if intermediate chambers of the phases, located downstream of the settling chamber and limited downstream by annular outlets, communicate with one another. The resulting equalisation of pressure tends to reduce uncertainties on the position of the interface.

Figure 2:
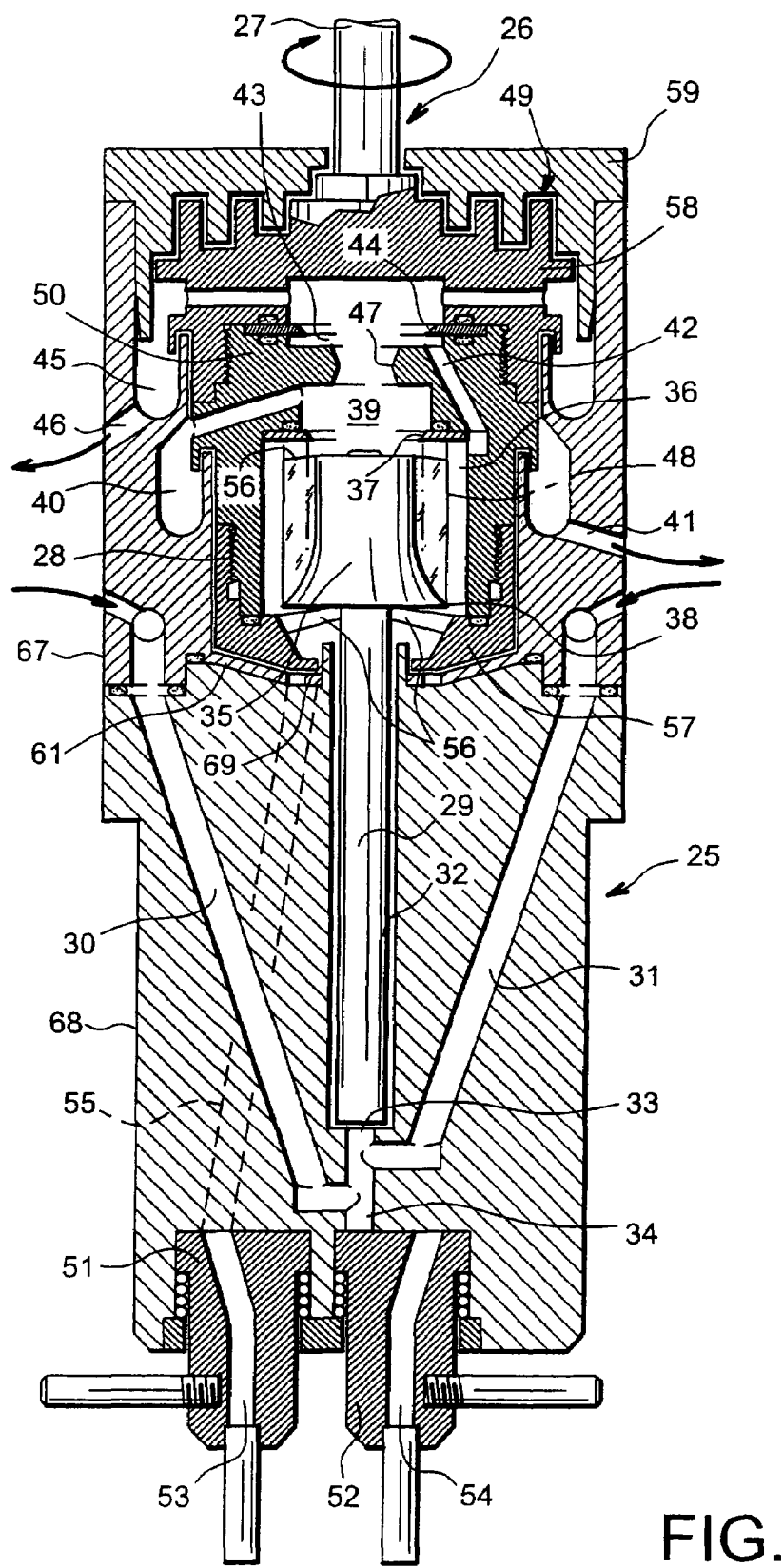
FIG. 2 illustrates an extractor according to the present invention.

All these refinements and others still will emerge from the commentary to FIG. 2, which illustrates a preferred embodiment of the invention. The housing (stator) is here designated by reference 25, the rotor by reference 26, and its rotating axis by reference 27. The rotor 26 again comprises a bowl 28, extending this time up above the housing 25, and also a section of axis 29 coaxial to the axis 27 and extending under the bowl 28, almost as far as below the housing 25, and also inside the bowl 28. The emulsion chamber 32 is delimited by the section of axis 29 and the wall (thicker than in the known embodiment) of the housing 25; it is prolonged by a certain height inside the bowl 28 by an annular lip 69 depending on the housing 25 and which contributes to delimiting the emulsion chamber 32 so as to prevent liquids from entering the space located between the bowl 28 and the housing 25. Positioned in the lower part of said stator are blades 61 which send back any liquids present in the abovementioned space, for example in the event the apparatus starts up in the presence of liquid. The emulsion chamber 32 is fed by inlet channels 30 and 31 of the two phases, which extend substantially vertically over the entire height of emulsion chamber 32 and join it via a vertical connecting channel 34 and a lower orifice 33. The liquid phases fill the majority of the channels 30 and 31 under any circumstances, and are set in rotation only after they have traversed the orifice 33.

The top of the section of axis 29 is fitted with a mobile portion 35 in the form of a muff, whereof the radius increases towards the base by forming a disc 38 restraining the section of the settling chamber 35, which extends about it. The liquid volume left to decant is controlled by the volume of the selected mobile portion 35, and by an annular outlet 37, whereof the internal radius is less than that of this disc 38, such that the latter is immersed and prevents air from entering the emulsion chamber 32 via downstream, just as the liquid filling the channels 30 and 31 offered the same protection upstream, and the mobile portion 35 also carries blades 56 for conveying the liquid into the settling chamber 36.

Extending beyond the outlet 37 is an intermediate chamber for the light phase 39, which communicates with a gathering ring of the light phase 40 which can be arranged in a helix, that is, its base is stepped down as far as an outlet channel 41 to benefit the flow outside the separator. A hollow channel 42 in the bowl allows the heavy phase to exit from the settling chamber 35 and to join an intermediate chamber for heavy phase 43 and to leave it via a second annular outlet 44. The heavy phase then rejoins a gathering ring 45, which also can optionally be in a helix or stepped, then leaves the separator via an outlet channel 46 terminating at the lowest point of the gathering ring 45. A communication 47 connects the intermediate chambers 39 and 43 and equalises the pressure there, thus reducing the parameters of uncertainty on the position of the interface 48 in the settling chamber 36. It will be noted that the annular outlets 37 and 44 are both mobile pieces, which allows them to be easily replaced by others for changing the conditions for controlling the separator. For this, the bowl 28 comprises a screwed base 57, which, when removed, allows removal of the section of axis 29 then the mobile portion 35 of the decanter which is fixed or assembled on the screwed base 57, and joined thereto via radii 56. In addition to this, the housing 25 comprises an upper portion 67 and a lower portion 68, which are superposed on one another with centring adjustment and gaskets. The lower portion 68 contains the channels 30 and 31, and the emulsion chamber 32 is hollowed out there; the upper portion 67 contains the bowl 28.

This construction offers modularity of the extractor, which constitutes an essential advantage of the invention. The rotor 26 can be composed of section of axis 29 and bowls 28 selected from the respective sets of different dimensions, and similarly the housing 29 can be made up of lower 68 and upper 67 portions selected from the respective sets of different dimensions, above all for the cavities of the emulsion chamber 32 and for the bowl 28.

The result of this is that dimensions of the emulsion chamber 32 and of the bowl 28 can be selected by the user in accordance with the process to be applied: the width of the emulsion chamber 32 will depend on the desired intensity of the chopping creating the emulsion; the radius of the bowl 28 will depend on the desired intensity of the centrifugal force creating separation of the phases; the height of the bowl 28 will depend on the desired inventory volume. It will not be necessary to seek to modify the process by changing the rotation speed of the rotor 26. Another possibility for regulating the volume of the bowl 28, which contains the phases, consists of replacing the outlet 37 by another, of which the lower edge has a different radius.

The bowl 28 thus comprises, apart from the screwed base 57, a main body 50 containing the external wall of the settling chamber 36 and thus determines, solely with outlet 37, the volume of the phases retained in the bowl 28; and finally, at the top, a screwed cover 58 (bearing the axis 27) which allows withdrawal of the outlet 44, as soon as it has been unscrewed. The entire rotor 26 can be withdrawn from the housing 25 after the cover 59 has been removed therefrom.

A deflector 49 extends to the top of the body 50 belonging to the rotor and containing the intermediate chambers.

Finally, the extractor comprises a pair of windings 51 and 52 in the base of the housing 25, both hollowed out by vertical evacuation ducts 53 and 54 whereof the first can be butt-welded to a tapping channel 55 leading underneath the bowl 28, in order to proceed with tapping mixed liquids, and whereof the second is butt-welded to the bass of the channel 34 to empty the extractor.

The supply phase rate treated in a prototype was three times larger than with known apparatus (with a steady extraction rate of solutes) for the same hold-up total.

The invention claimed is:

1. A centrifugal extractor of two fluid phases, comprising:
    a central rotor rotating about an axis of rotation and comprising a bowl, a stator, a settling chamber in the bowl of the rotor, and an emulsion chamber between the rotor and the stator,
    the emulsion and settling chambers communicating between them and the emulsion chamber being placed under the settling chamber,
    wherein the emulsion and settling chambers are aligned in succession on the axis of rotation of the rotor, the rotor comprising a section of axis delimiting the emulsion chamber, and wherein the stator and the rotor are composed of separably assembled portions, the rotor comprising a first portion comprising a peripheral wall of the settling chamber and a second portion comprising the section of axis.

2. The extractor as claimed in claim 1, wherein the second portion of the rotor comprises a base of the bowl attached to the first portion, and radii joining the base to the section of axis.

3. The extractor as claimed in claim 1, wherein the stator comprises first and second superposed portions with centering adjustment, the first superposed portion being hollowed out of a cavity for the bowl and the second superposed portion being hollowed out from a cavity delimiting an external wall of the emulsion chamber.

4. The extractor as claimed in claim 1, wherein the settling chamber has a greater radius than the emulsion chamber.

5. The extractor as claimed in claim 1, wherein the section of axis of the rotor has a radius increase, on a portion extending into the settling chamber, going towards the emulsion chamber, the portion having a greater radius than an opening radius of a portion of the bowl, by which a light fluid phase discharges outside the settling chamber.

6. The extractor as claimed in claim 1, wherein intermediate chambers of phases, located downstream of the settling chamber and limited by annular outlets, communicate with one another.

7. The extractor as claimed in claim 1, wherein the section of axis extends into the settling chamber and comprises blades.

8. The extractor as claimed in claim 1, further comprising gathering rings of phases downstream of the settling chamber and that have a base inclined towards outlet orifices of the separator.

9. The extractor as claimed in claim 1, wherein the bowl comprises a mobile discharge portion of a light phase outside the settling chamber.

10. The extractor as claimed in claim 1, wherein the stator comprises an annular lip contributing to delimit the emulsion chamber and extending into the bowl.

11. A centrifugal extractor of two fluid phases, comprising:
    a central rotor rotating about an axis of rotation and comprising a bowl, a stator, a settling chamber in the bowl of the rotor, and an emulsion chamber between the rotor and the stator,
    the emulsion and settling chambers communicating between them and the emulsion chamber being placed under the settling chamber,
    wherein the emulsion and settling chambers are aligned in succession on the axis of rotation of the rotor, the rotor comprising a section of axis delimiting the emulsion chamber, and wherein the emulsion chamber communicates with inlet and retention channels of phases extending substantially vertically to a side of the emulsion chamber and leading by lower ends to a lower end of the emulsion chamber.

* * * * *